United States Patent [19]

Blot

[11] Patent Number: 4,712,468
[45] Date of Patent: Dec. 15, 1987

[54] DISTRIBUTION VALVE ASSEMBLY FOR A PNEUMATIC BRAKE BOOSTER

[75] Inventor: Jean-Claude Blot, Louvres, France

[73] Assignee: Bendix France, Paris, France

[21] Appl. No.: 907,551

[22] Filed: Sep. 12, 1986

[30] Foreign Application Priority Data

Sep. 30, 1985 [FR] France ................................ 85 14453

[51] Int. Cl.$^4$ ............................................... F15B 9/10
[52] U.S. Cl. ................................ 91/376 R; 91/369 A; 60/547.1
[58] Field of Search ............. 91/376 R, 369 R, 369 A, 91/369 B; 60/547.1

[56] References Cited

U.S. PATENT DOCUMENTS

| | | | |
|---|---|---|---|
| 2,828,719 | 4/1958 | Ayers | 121/41 |
| 3,727,516 | 4/1973 | Myers et al. | 91/376 R |
| 3,754,450 | 8/1973 | Putt et al. | 91/369 A |
| 3,981,227 | 9/1976 | Azuma | 91/376 R |
| 4,350,076 | 9/1982 | Thiel | 91/369 A |

FOREIGN PATENT DOCUMENTS

| | | | |
|---|---|---|---|
| 2523910 | 9/1983 | France | 91/376 R |
| 2060100 | 4/1981 | United Kingdom . | |

Primary Examiner—A. Michael Chambers
Attorney, Agent, or Firm—Larry J. Palguta; Ken C. Decker

[57] ABSTRACT

The support (14) for the resilient valve member (2) of the distribution valve assembly has an internal end zone (26) extending radially in the vicinity of the front annular active part (4) of the valve member (2) and forming, at the front, a bearing surface for an elastic washer (32) constituting the valve spring and, at the rear, a bearing surface for the return spring (28) of the booster input rod (8). The internal end zone (26) advantageously consists of a front part (15) for supporting the valve member, which part is mounted on a channel (19; 20; 21) receiving the external mounting part (13) of the valve member (2) and formed by a rear part (16) of the valve member support, which part is mounted in the rear end (17) of the tubular hub (1).

10 Claims, 2 Drawing Figures

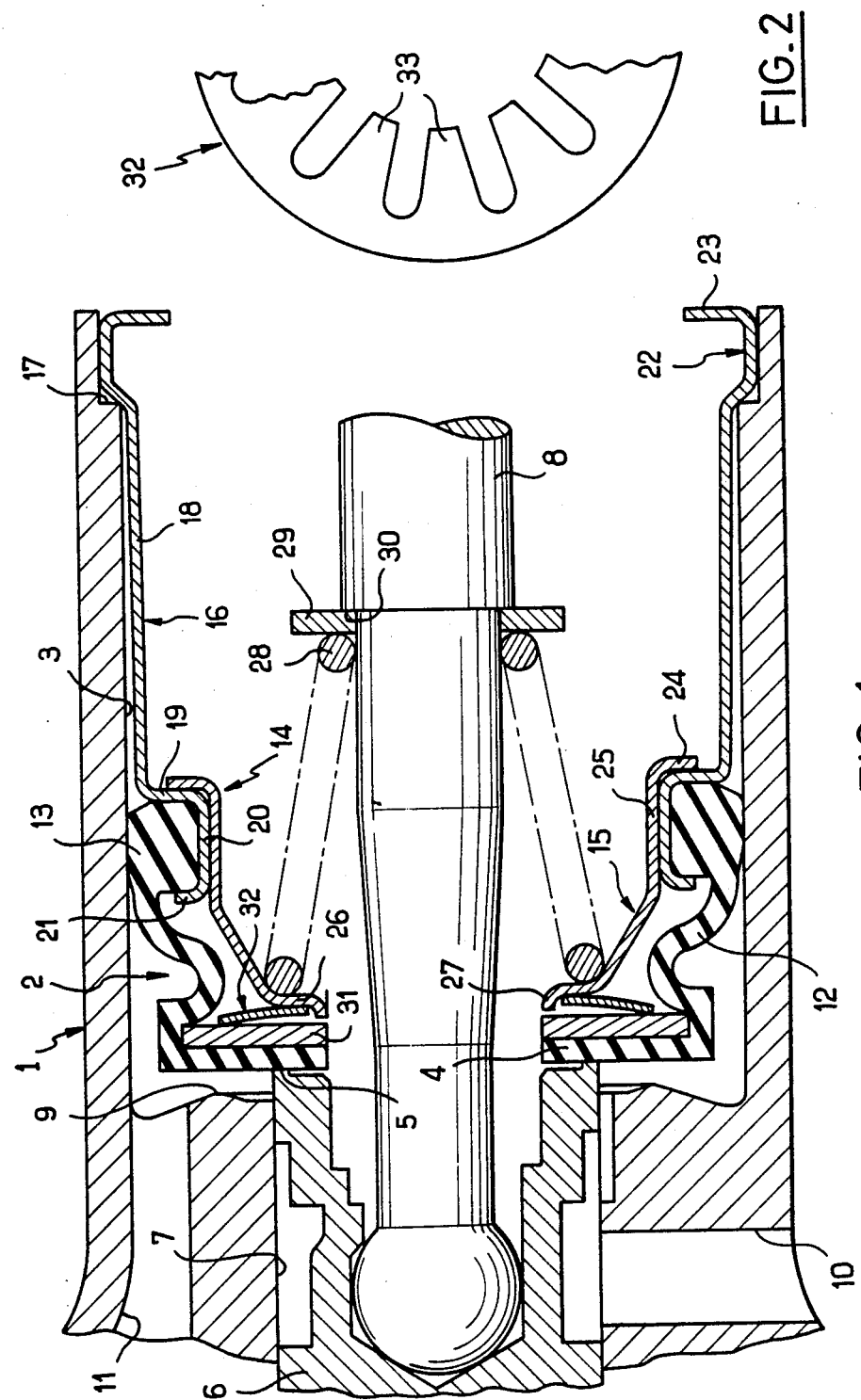

DISTRIBUTION VALVE ASSEMBLY FOR A PNEUMATIC BRAKE BOOSTER

The present invention relates to pneumatic brake boosters and, more particularly, to a distribution valve assembly for such boosters, of the type comprising, inside a tubular hub of a booster piston, a resilient valve member associated with a valve-member support and comprising an annular active part co-operating selectively with two concentric valve seats formed in the hub and by a valve plunger, respectively, the valve plunger sliding inside the hub and being coupled to a booster input rod, and an external mounting part sealingly arranged between an internal wall of the tubular hub and the valve-member support mounted in the tubular hub, a rod return spring between the valve-member support and a bearing surface on the rod, and a valve spring between the valve-member support and the active part of the valve member so as to bias the active part in the direction of the valve seats.

An assembly of this type is described in FR-A-No. 1,512,696. In the distribution valve assembly of this document, the valve spring is constructed in the form of a helical spring which has, by way of necessity, a relatively large axial length requiring a corresponding dimensioning of the valve member, in an arrangement capable of causing, moreover, problems with regard to misalignment or off-setting of the active part of the valve in relation to the concentric valve seats.

It is therefor an object of the present invention to provide a distribution valve assembly of the above-mentioned type, which has a reliable, robust and compact design and low manufacturing costs and which makes it possible to reduce the variation in spring characteristics in mass production.

In order to achieve this, according to a feature of the invention, the valve-member support has an internal end zone extending radially in the vicinity of the active part of the valve member and forming a bearing surface for an elastic washer constituting the valve spring, this internal end zone of the valve-member support also advantageously forming a bearing surface for the return spring of the input rod.

The invention will now be described by way of example with reference to the accompanying drawings in which:

FIG. 1 is a diagrammatic view, in longitudinal section, of a distribution valve assembly of a pneumatic brake booster according to the invention; and FIG. 2 is a partial plan view of the elastic washer forming the valve spring of the assembly shown in FIG. 1.

FIG. 1 shows the rear tubular hub part 1 of a booster piston assembly (not shown) dividing internally a booster housing (not shown) into a front vacuum chamber and a rear working chamber, the latter being selectively connected to the front vacuum chamber or to the atmosphere by means of a conventional, annular, valve member, indicated generally by the reference number 2, which is arranged inside an internal recess 3 of the tubular hub 1 and has a front annular active part 4 capable of co-operating selectively with a first valve seat 5 formed at the rear end of a valve plunger 6 slideably mounted inside a central bore 7 of the hub and coupled to the end of an input actuating rod 8 of the booster, and with a second valve seat 9 formed in the hub 1, concentrically around the plunger 6. By co-operating with the valve seats 5 and 9, the active part 4 of the valve member 2 thus makes it possible to control the connection of a radial passage 10, which is formed in the hub 1 and communicates with the rear working chamber of the booster and leads into the bore 7, either to the atmosphere prevailing inside the recess 3 of the tubular hub 1, around the input rod 8, or to the front vacuum chamber of the booster via at least one passage 11 formed axially in the hub 1 and leading into a connection zone between the internal end of the recess 3 and the external periphery of the valve seat 9.

The front annular active part 4 of the valve member 2 is connected, by means of a tulip-shaped covering part 12 which widens radially outwards, to a mounting part or annular external flange 13 compressed between the wall of the recess 3 and a valve-member support indicated generally by the reference number 14. In the embodiment shown, the valve-member support 14 consists of the assembly of a front part 15 and a rear part 16 both advantageously made of sheet metal. In the embodiment shown, the internal recess 3 of the tubular hub 1 is in the form of a smooth cylindrical bore with a constant diameter extending over most of the axial extension of the tubular hub 1, with a small rear indentation 17 extending radially outwards and formed at the rear end of the tubular hub 1. The rear part 16 of the valve-member support 14 consequently has a main tubular part 18 shaped, at its front end, so as to form an annular channel which is offset radially inwards and has a rear radial surface 19 connected to the main tubular part 18, and an internal axial surface 20 ending, at the front, in a short front radial surface 21, extending radially outwards. The rear end of the main tubular part 18 forms a channel 22, offset radially inwards, which is fitted into the rear indentation 17 in the hub 1 and advantageously has an end lug 23 folded radially inwards for mounting the end flange of a sealing bellows (not shown) extending axially around the tubular hub 1 and engaging on the rear shell of the booster housing.

In the embodiment shown, the front part 15 of the valve-member support 14 has an annular rear external end 24 extending radially outwards and bearing against the rear radial surface 19 of the front channel of the rear part 16 of the valve-member support 14 and being connected to an axial zone 25 co-operating with the internal axial surface 20 of the front channel of the rear part 16 of the support 14. This axial zone 25 of the front part 15 of the support 14 is extended towards the front by a middle part converging forwards and radially inwards and ending in an internal end part 26 extending radially inwards, in the vicinity of the rear surface of the active part 4, and itself ending in a small rounded end part 27 extending axially towards the front.

As can be seen clearly in FIG. 1, the mounting part or external flange 13 of the valve member 2 is mounted in the front channel 19-20-21 of the rear part 16 of the valve-member support 14 and is kept radially compressed inside the recess 3 between the internal wall of the latter and the channel, while being positioned axially inside the recess 3 by the mounting of the rear channel 22 inside the rear indentation 17 of the hub 1. The front part 15 of the valve-member support 14 is positioned and held in the position described above and shown in FIG. 1, by a tapered, helical, rod-return spring 28 arranged between the rear surface of the radial end zone 26 and a washer 29 mounted on the input rod 8 and cooperating with a shoulder 30 of the latter.

According to the invention, between the annular reinforcing plate 31, with which the front active part 4 of the valve member 2 is conventionally provided, and the front surface of the radial end zone 26 of the front part 15 of the valve-member support 14, which is dimensioned so that this radial end zone 26 extends in the vicinity of the reinforcing plate 31, parallel to the latter, there is arranged a curved elastic washer 32 axially biasing the active part 4 of the valve member 2 in the direction of the valve seats 5 and 9. As can be seen in FIG. 2, the elastic washer 32, typically a Belleville-type washer, advantageously comprises internal radial fingers 33 which are deformed axially so as to possess the required elastic force. Alternatively, the elastic washer 32 may itself form the reinforcing element 31 for the active part 4 of the valve member 2, in which case only a few radial fingers 33 are deformed axially in order to ensure the required elasticity.

I claim:

1. A distribution valve assembly for a pneumatic brake booster, comprising, inside a tubular hub of a booster piston, a resilient valve member associated with a valve-member support and comprising an annular active part cooperating selectively with two concentric valve seats formed in the hub, an external mounting part sealingly arranged between an internal wall of a tubular hub and said valve-member support mounted in the tubular hub, a rod-return spring between said valve-member support and a bearing surface on an input rod, and a valve spring between said valve-member support and said active part of said valve-member so as to bias said active part in a direction toward said valve seat, and a valve plunger sliding inside the hub and coupled to the input rod of the booster, characterized in that said valve-member support has an internal end zone extending radially inwardly adjacent said active part of said valve-member and forming a bearing surface for the valve spring which consists of a resilient washer formed by an annular revolution that minimizes the axial dimension thereof, and the rod return spring bearing against the internal end zone of said valve-member support to bias the internal end zone into engagement with the washer.

2. The assembly according to claim 1, characterized in that valve-member support forms an annular U-shaped channel receiving said external mounting part of said valve member.

3. The assembly according to claim 2, characterized in that said valve-member support has a rear tubular part having a U-shaped end which which is offset radially outwardly and received in a rear recessed portion in said tubular hub.

4. The assembly according to claim 3, characterized in that the internal wall of said tubular hub is cylindrical and smooth.

5. The assembly according to claim 4, characterized in that the internal end zone of said valve-member support consists of a front support part mounted on said annular U-shaped channel.

6. The assembly according to claim 5, characterized in that said channel has an internal axial surface and a rear radial surface, said front support part having an external end extending radially outwardly and cooperating so as to bear against said rear radial surface of said channel.

7. The assembly according to claim 6, characterized in that said radial external end of said front support part is connected to an axial zone cooperating with said internal axial surface of said channel.

8. The assembly according to claim 7, characterized in that said annular channel and said rear tubular part consist of a rear part of said valve-member support.

9. The assembly according to claim 8, characterized in that said valve-member support is made of sheet metal.

10. The assembly according to claim 1, characterized in that the resilient washer includes a plurality of radially inwardly extending internal figures which engage said internal end zone.

* * * * *